Dec. 29, 1925.

F. J. TONE ET AL 1,567,772

ANTISLIP SURFACE AND METHOD OF MAKING THE SAME

Filed May 23, 1922

INVENTORS
Frank J. Tone
Miner L. Hartmann
By Byrnes, Stebbins & Parmelee
Their Attys Patented Dec. 29, 1925.

1,567,772

UNITED STATES PATENT OFFICE.

FRANK J. TONE AND MINER L. HARTMANN, OF NIAGARA FALLS, NEW YORK, ASSIGNORS TO THE CARBORUNDUM COMPANY, OF NIAGARA FALLS, NEW YORK, A CORPORATION OF PENNSYLVANIA.

ANTISLIP SURFACE AND METHOD OF MAKING THE SAME.

Application filed May 23, 1922. Serial No. 563,119.

*To all whom it may concern:*

Be it known that we, FRANK J. TONE and MINER L. HARTMANN, both residents of Niagara Falls, Niagara County, New York, have invented a new and useful Improvement in Antislip Surfaces and Methods of Making the Same, of which the following is a full, clear, and exact description.

Our invention relates to the use of abrasive grains in antislip floor or tread surfaces. Heretofore it has been proposed to employ grains of abrasives, such as silicon carbide or grains of aluminous abrasives in connection with treads or floor surfaces of concrete, terrazzo, etc., to give antislip properties thereto.

Our invention relates to this subject, and is especially designed to improve the adhesion between the abrasive grains and the matrix. In practice, it has been found that when untreated abrasive grains are embedded in such surfaces, they are apt to pull or work out of the cement or concrete after a certain amount of use. Our invention is designed to improve this adhesion by increasing the surface adhesive qualities of the grains which are embedded in the floor or tread surface.

Figure 1:
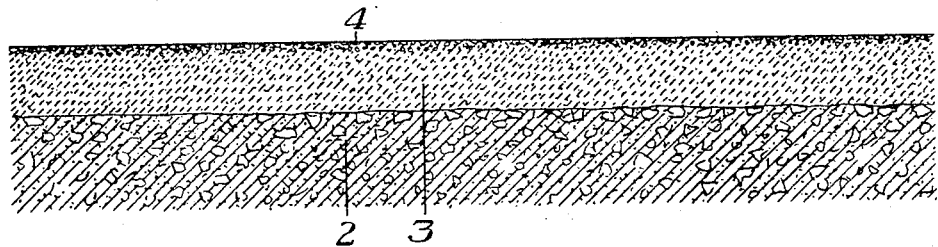

The invention will best be understood by reference to the accompanying drawings, in which:

Figure 1 is a section of an anti-slip floor having grains treated in accordance with our invention embedded in the surface thereof, and Figures 2, 3, 4 and 5 are diagrammatic views of individual grains, greatly enlarged, illustrating the various methods of treating the grains in accordance with the present invention.

Figure 2:
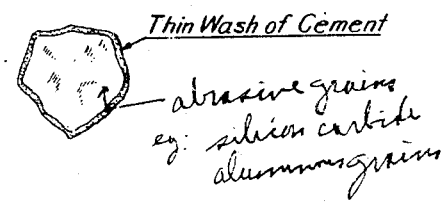
Figure 3:
Figure 4:
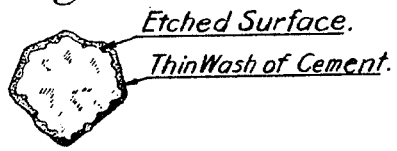

In carrying out our invention, we may coat the grains with a thin wash of cement, as illustrated in Figure 2, and let this coating set and harden to improve the surface adhesion qualities, or we may roughen or alter the surface of the grains, as for instance, by etching, as illustrated in Figure 3, to give a pitted or roughened surface, and thus increase the bonding qualities. We may also carry out both of these steps, that is, we may etch or roughen the concrete surfaces of the grains and then provide them with a thin wash or coat of Portland cement or similar material to further improve the adhesive qualities, as illustrated in Figure 4.

In actual test, taking the value of untreated aluminous abrasive grains with a binder such as used in flooring as a value of 100, we find that by using etched, pitted or roughened grains, a tensile value is obtained of 150 on account of the increased adhesion. By taking the same grains and providing them with a thin wash of cement and letting this coating harden in the usual manner, the grains so coated will give a value in the matrix of about 180 tensile strength.

By combining these two methods and first etching or pitting the grains and then coating them with a Portland cement wash, such grains may in the matrix give a tensile strength of about 230.

This invention is of great value in the manufacture of antislip floor surfaces, particularly those using Portland cement or concrete as a binder, as illustrated in Figure 1. In producing such surfaces, the subfloor is usually made of a coarse concrete aggregate 2, and a wearing surface 3 about an inch in thickness composed of equal mixtures of sand and Portland cement is then laid on the base. The abrasive grains when treated in accordance with our invention, either by pitting, etching or roughening or by using coated grains 4 or by using both methods, may then be sprinkled or sifted over the surface while it is still wet, preferably in the proportion of about three to five pounds per square yard. The treated grains are then worked in with light pressure, as for instance, by steel smoothers, trowels or wooden floats. When the surface thus prepared is set, it presents a very efficient antislipping tread or floor surface with much less tendency of the grains to pull or work out of the matrix.

We may also apply this invention in the manufacture of floors of the terrazzo type, in which case we preferably mix the abrasive grains with the cement or concrete mixture which forms a matrix or bond for the marble or stone chips and other components of the terrazzo aggregate. After the terrazzo floor is thus formed, whether polished or ground on its surface or not, the abrasive grains appear on the surfaces only in those portions of the aggregate where the mortar or matrix is exposed, this giving an efficient antislipping component to the surface.

We may also employ this system in making up the mortar or cement employed in laying ordinary tile or mosaic tile. We may also mix these treated grains with the mortar or cement employed in the setting of glass pieces in vault lights. In fact, the treated grains may be employed in all types of floor or tread constructions or tiles wherein a matrix or cement or mortar is used, to give antislipping properties.

Figure 5:
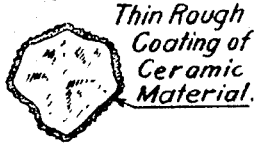

The grains which are treated may be either natural or artificial abrasive grains and the surfaces of the grains may be improved in adhesive properties by methods other than those which we have described. For example, a thin rough coating of ceramic material may be washed or burned on the surface of the grains, as illustrated in Figure 5, or other forms of cement may be employed similar to the Portland cement wash.

The advantages of our invention will be obvious to those skilled in the art since the pulling or working out of abrasive grains in antislip flooring or tread surfaces is greatly reduced and a more efficient surface provided for continued use.

The nature of the abrasive grains and the method of improving their adhesive qualities may be widely varied, without departing from our invention as defined in the broader claims.

We claim:

1. An antislip floor or tread surface having embedded therein abrasive grains, whose surfaces have been provided with a roughening coating before embedding.

2. An antislip floor formed of an aggregate and having embedded in its tread surface grains which have been roughened and coated prior to placing on the surface of the floor.

3. In the manufacture of antislip tread or floor surfaces, the steps consisting of artificially roughening the surfaces of abrasive grains and then embedding them in at least a part of said surface.

4. In the manufacture of antislip tread or floor surfaces, the steps consisting of providing abrasive grains with a thin adherent coating, and then embedding said grains in a concrete aggregate to form at least the upper portion or tread surface of the floor.

5. In the manufacture of antislip tread or floor surfaces, the steps consisting in artificially pitting, roughening or etching said grains, providing them with a thin adherent coating, and then embedding them in at least a part of the floor or tread surfaces.

In testimony whereof we have hereunto set our hands.

FRANK J. TONE.
MINER L. HARTMANN.